2,862,959

PRODUCTION OF MIXED ESTERS OF PHTHALIC ACID

Tracy M. Patrick, Jr., Kirkwood, and Louis O. Raether, Webster Groves, Mo., assignors to Monsanto Chemical Company, St. Louis, Mo., a corporation of Delaware No Drawing. Application February 6, 1956
Serial No. 563,416

9 Claims. (Cl. 260—475)

This invention relates to the production of mixed esters of phthalic acid and, more particularly, to an improved process for the production of such mixed esters without the formation of undesired by-products. The expression "mixed esters of phthalic acid" as used herein is meant to include unsymmetrical di-alkyl and cycloalkyl-alkyl esters of phthalic acid.

The ever expanding use of plastic materials, especially of the light colored types, including vinyl chloride polymers or copolymers, polyvinyl acetate, cellulose esters, acrylate and methacrylate resins, has created a large demand for suitable plasticizers. Alkyl esters, and particularly di-2-ethylhexyl phthalate and di-n-octyl phthalate, have been known to be satisfactory plasticizers for the aforementioned high molecular weight materials, but the supply has been unable to keep pace with the expansion of the plastics industry, largely because of a shortage of alcohols suitable for the manufacture of the desired esters.

One of the prime considerations given to any ester for use in such a manner is the purity of the product, i. e., the lack of contaminating materials giving the product undesirable color characteristics, acidity or other deleterious properties, which may cause the ester or the materials with which they are mixed to be unstable or cause the products to be unusable. Accordingly, an extensive amount of work has been done in an effort to improve esterification procedures.

Mixed di-alkyl phthalates can be prepared by simply reacting phthalic acid with a mixture of the desired alcohols in the presence of a suitable esterification catalyst. This results, however, in a final mixture which contains as little as 50% of the desired mixed ester; the unreacted alcohols, acid, mono-ester and the symmetrical di-esters form the balance.

Another procedure is by the preparation of the symmetrical di-alkyl ester first, i. e., by esterifying the acid to the point of neutralization with one alcohol, and then reacting the ester so obtained with a higher boiling alcohol and removing the low boiling alcohol during the process until a partial alcoholysis has been effected. The resulting product usually contains a substantial quantity of the unreacted higher boiling alcohol and the unaltered lower boiling ester.

The principal object of this invention, therefore, is to provide for an improved process for the production of mixed esters of phthalic acids.

A further object of this invention is to provide a method for the production of such mixed esters of phthalic acids from phthalic anhydride, wherein the formation of the symmetrical di-esters is substantially prevented.

Still further objects and advantages of this invention will become apparent from the following description and the appended claims.

The process of our invention is represented by the following equation:

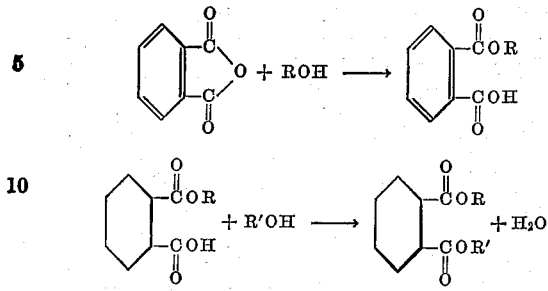

wherein R represents an alkyl or cycloalkyl radical containing from 4 to 9 carbon atoms and R' represents an alkyl radical containing from 6 to 14 carbon atoms, but always contains at least 2 more carbon atoms than R.

We have found that by reacting phthalic anhydride with the lower or lowest molecular weight alcohol to form the phthalic half ester and then reacting said half ester with the higher alcohol in the presence of an acid esterification catalyst, the resulting product contains approximately 80–90% of the desired mixed ester. This discovery was most unexpected, since prior knowledge would lead to the prediction that the result would best be obtained by using the higher alcohol first. In practice, however, we have found that in using this procedure a considerable amount of the symmetrical di-esters is formed and the desired mixed ester represents as little as 50% of the ester content of the final reaction mixture.

The process of this invention is carried out in two stages, the phthalic anhydride first being reacted with that quantity of the first alcohol (ROH as defined above) theoretically required to form the half ester. The second, or di-ester stage, comprises reacting the half ester so formed with an excess of the second alcohol (R'OH as defined above) in the presence of an acid esterification catalyst.

The first stage is best carried out at a temperature of from 125–130° C.; however, temperatures not exceeding about 150° C. may be used, and at atmospheric pressure, and is continued for a sufficient period of time to form the half ester, usually 15 minutes to a half hour, or longer depending on the alcohol used. Prolonged heating or higher temperatures are to be avoided; otherwise, the di-ester of the first alcohol and other undesirable products will be formed in considerable quantities. Operating in this manner results in almost complete conversion of the phthalic anhydride and the first alcohol to the corresponding acid phthalate or half ester.

In the second stage an excess of the second alcohol is added, the optimum amount depending upon the economics of the over-all process, but at least a sufficient amount to carry off the water of esterification. An acid esterification catalyst is added at this point, and this reaction is preferably carried out at a temperature of from 125–130° C.; however, temperatures not exceeding about 150° C. may be used. The pressure is reduced to 100 mm. immediately, and gradually reduced, to maintain a suitable reflux rate, until the maximum vacuum obtainable is reached. The esterification is continued until a titration shows the reaction to be essentially complete.

After the reaction is complete, the di-ester content may be recovered from the reaction mixture by any of the methods well known to those skilled in the art of the recovery and purification of esters of phthalic acid.

The product obtained at this point consists primarily (85% plus) of the desired mixed ester which has highly desirable plasticizer properties, i. e., good color, low volatility, low acidity, low moisture content, etc. The pure mixed ester may be isolated by further refining, however we have found that the product is readily usable as a plasticizer without such refining.

As above indicated, the second stage of the process is carried out in the presence of an acid catalyst. In practice, sulfuric acid was found to be very satisfactory and may be used in a quantity equal to, for example, 1–3% of the weight of the phthalic anhydride. As is known, however, other acid substances catalyze the reaction, e. g., acid resins, aromatic sulfonic acids, etc.

Specific examples of alcohols which may be used in the first stage of the process include, for example: butyl alcohol, isoamyl alcohol, cyclopentanol, cyclohexanol, heptyl alcohol, 2-ethylhexyl alcohol, 5-methyl-1-heptyl alcohol, $C_8$ "oxo" alcohol and others of similar character.

Specific examples of alcohols which may be used in the second stage of the process include, for example: heptyl alcohol, 2-ethylhexyl alcohol, octyl alcohol, $C_8$ and $C_{10}$ "oxo" alcohols; nonyl alcohol, decyl alcohol, tetradecyl alcohol and others of similar character.

This invention is illustrated by the following examples wherein all parts are by weight:

EXAMPLE I 296 parts of phthalic anhydride and 148 parts of butanol (stoichiometric quantity) are charged into a suitable reaction vessel fitted with a spray-trap condenser, an oil-water separator and an efficient agitator. With the contents of the vessel thoroughly agitated, they are heated up to a controlled temperature of from 125–130° C. and held there for 30 minutes. To the resulting butyl acid phthalate is charged 316 parts of decyl alcohol and 4 parts of 78% sulfuric acid. As the mass is being agitated, the system is heated and evacuated to 100 mm. mercury at such a rate that no flooding of the condenser will occur. The reaction temperature is maintained at 125–130° C., and the reflux is maintained at a suitable rate by controlling the vacuum. The forward flow from the condenser is set toward the oil-water separator, and the alcohol is continuously returned to the reactor. The esterification is continued until a titration shows the reaction is esentially complete. In this way, 95% of the phthalic anhydride is esterified in little more than 3 hours to give a product in which 80–90% of the ester content is butyl decyl phthalate.

The crude reaction mixture is then cooled, washed with sodium carbonate solution to remove the free acid, and the resulting ester is washed with water. The product is then steam distilled to remove volatiles and the sodium carbonate-water treatment is repeated. After the final wash, the wet ester is distilled under vacuum at a temperature of about 100° C. in the presence of activated charcoal. After all the water is removed, the batch is then filtered to remove the charcoal.

The dry product so obtained is a clear, oily liquid which contains 85% of butyl decyl phthalate, the remaining portion consisting of approximately equal quantities of dibutyl and didecyl phthalate.

Properties

Refractive index $n_D^{25}$ _____ 1.4800
Specific gravity 25/25 _____ 0.9890

EXAMPLE II

The reaction in Example I is carried out in an identical manner, except that the order of addition of the two alcohols is reversed, that is, a stoichiometric quantity of decyl alcohol is added first to form the half ester and then a slight excess of butanol is reacted with the half ester to form the di-ester.

The dry product so obtained consists of only 50% of the desired butyl decyl phthalate.

Properties

Refractive index _____ 1.4840
Specific gravity _____ 0.9996

What is claimed is:
1. In a process for the manufacture of a mixed ester of phthalic acid of the general formula,

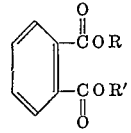

wherein R represents a radical selected from the group consisting of alkyl and cycloalkyl radicals having from 4 to 9 carbon atoms and R' represents an alkyl radical containing from 6 to 14 carbon atoms and always contains at least 2 more carbon atoms than R, the steps which consist of heating phthalic anhydride with a stoichiometric quantity of ROH and then heating the resulting phthalic half ester with a slight excess of R'OH (where R and R' have the same meaning as above) in the presence of an acid esterification catalyst.

2. A process for the manufacture of a mixed ester of phthalic acid which comprises reacting phthalic anhydride with a stoichiometric quantity of ROH, wherein R represents a radical selected from the group consisting of alkyl and cycloalkyl radicals containing 4 to 9 carbon atoms, reacting the resulting phthalic half ester with a slight excess of R'OH, wherein R' represents an alkyl radical containing from 6 to 14 carbon atoms but always contains at least 2 more carbon atoms than R, in the presence of an esterification catalyst, and separating the resulting mixed ester.

3. A process for the manufacture of a mixed ester of phthalic acid which comprises reacting phthalic anhydride with a stoichiometric quantity of ROH, wherein R represents a radical selected from the group consisting of alkyl and cycloalkyl radicals containing from 4 to 9 carbon atoms, at a temperature not exceeding about 150° C., reacting the resulting phthalic half ester with a slight excess of R'OH, wherein R' represents an alkyl radical containing from 6 to 14 carbon atoms but always contains at least 2 more carbon atoms than R, at a temperature not exceeding about 150° C. in the presence of an acid esterification catalyst and separating the resulting mixed ester.

4. A process for the manufacture of a mixed ester of phthalic acid which comprises reacting phthalic anhydride with a stoichiometric quantity of ROH, wherein R represents a radical selected from the group consisting of alkyl and cycloalkyl radicals containing from 4 to 9 carbon atoms, at a temperature of about 130° C., and reacting the resulting phthalic half ester with a slight excess of R'OH, wherein R' represents an alkyl radical containing from 6 to 14 carbon atoms but always contains at least 2 more carbon atoms than R, at a temperature of about 130° C. in the presence of sulfuric acid and separating the resulting mixed ester.

5. The process of claim 4 wherein ROH is butyl alcohol and R'OH is 2-ethylhexyl alcohol.

6. The process of claim 4 wherein ROH is 4-methyl-2-pentanol and R'OH is decyl alcohol.

7. The process of claim 4 wherein ROH is butyl alcohol and R'OH is decyl alcohol.

8. The process of claim 4 wherein ROH is cyclohexanol and R'OH is decyl alcohol.

9. The process of claim 4 wherein ROH is butyl alcohol and R'OH is $C_8$ "oxo" alcohol.

References Cited in the file of this patent

UNITED STATES PATENTS 1,700,960    Van Schaack _____ Feb. 5, 1929
2,742,494    Mraz _____ Apr. 17, 1956